United States Patent [19]

Malecki et al.

[11] 4,183,374

[45] Jan. 15, 1980

[54] FLUID PULSE COUNTER

[75] Inventors: Ronald J. Malecki, Brown Deer; Charles P. O'Neil, Cudahy, both of Wis.

[73] Assignee: Amerace Corporation, New York, N.Y.

[21] Appl. No.: 905,462

[22] Filed: May 12, 1978

Related U.S. Application Data

[63] Continuation of Ser. No. 756,029, Dec. 29, 1976, abandoned.

[51] Int. Cl.[2] .............................................. G05B 19/44

[52] U.S. Cl. ............................ 137/624.2; 137/625.27; 251/230

[58] Field of Search ...................... 137/624.13, 624.15, 137/624.18, 624.2, 625.27; 251/230

[56] References Cited

U.S. PATENT DOCUMENTS

| | | | |
|---|---|---|---|
| 3,145,736 | 8/1964 | Gheen | 137/624.13 |
| 3,172,637 | 3/1965 | Adams | 137/625.27 X |
| 3,344,809 | 10/1967 | Smith | 251/230 X |
| 3,489,155 | 1/1970 | Loveless | 137/624.2 |
| 3,489,175 | 1/1970 | Loveless et al. | 137/624.15 X |

*Primary Examiner*—Alan Cohan

*Attorney, Agent, or Firm*—Richard A. Craig; S. Michael Bender

[57] ABSTRACT

Apparatus for providing a fluid pressure output signal upon receipt of fluid pressure input pulses in predetermined number. Fluid pressure isolation is provided as between input and output portions of the apparatus whereby the fluid pressure level of the output signal may be variably preselected irrespective of the pressure level of the input pulses.

12 Claims, 5 Drawing Figures

FLUID PULSE COUNTER

This is a continuation of application Ser. No. 756,029, filed Dec. 29, 1976 now abandoned.

FIELD OF THE INVENTION

This invention relates generally to presettable pulse counters providing sensible output indication and, more particularly, to fluid pressure pulse counters of this type which are operative to provide a fluid pressure output pulse on receipt of a variably preselectable number of fluid pressure input pulses.

BACKGROUND OF THE INVENTION

Counter-output apparatus of the above-noted general type finds application in various industrial endeavors, a principal use thereof being found in controlling manufacturing processes. In such use, input signals generated on completion of each of a preselected number of successive operations on a workpiece are applied to the apparatus and are accumulated and an output signal is then generated on accumulation in such preselected number for effecting transferral of the workpiece to a succeeding work station, or other change in activity. In accommodating this practice, the counter apparatus need have various functional capabilities. It is required to be operator-presettable to yield such output signal upon occurrence of such preselected number of operations (presetting function). The apparatus need count individual such operations (accumulate function), have the capability of retaining counts (count latch function), provide an output indication of count accumulation in preset amount (preset count output function) and have the capability of returning to its original condition (reset function).

Exemplary of diverse prior art apparatus of this type are devices shown in U.S. Pat. Nos. 1,908,626 (Ford) and 3,489,175 (Loveless et al.). The Ford patent sets forth a mechanism which accommodates the foregoing functions, however, with various operational limitations. The mechanism is responsive only to translatory mechanical input signals in its accumulate function. It achieves its presetting function only upon disassembly of releasably secured count presetting components. In its preset count output function, the Ford apparatus effects mechanical operation of an apparatus-contained electrical switch and does not depict structure providing desirable fluid pressure output signals external to the apparatus. It includes a reset mechanism operative to clear the apparatus to original preset condition solely in response to mechanical activity and then simultaneously with attainment of such preset count.

The Loveless et al. patent discloses apparatus which is desirably responsive to fluid pressure pulse input in its accumulate function and is count-presettable without component disassembly. However, the mechanism thereof achieves its count latch function by dependence upon such fluid pressure pulse input. In its preset count output function, this apparatus conveys its input pulse to an output port and thereby has its output signal limited in pressure characteristic. In its reset function, the Loveless et al. apparatus releases such latch in response to a change in differential fluid pressure across its latch piston coincidental with the last pulse in the counting sequence. While mechanically resettable at any time, the apparatus is not fluid pressure resettable at user option at any time during or after the count sequence.

SUMMARY OF THE INVENTION

The present invention has as its object the provision of expanded operational adaptiveness in presettable fluid pressure pulse counters.

In attaining the foregoing and other objects, the invention provides counter apparatus having various operational features, usable separably and in entire combination, as desired. In one aspect, the invention provides apparatus having fluid pressure independence as between its input fluid pressure responsive parts and its output signal providing parts. Its latching function is maintainable independently of input fluid pressure. The apparatus may be reset by fluid pressure derived either from its output signal providing parts or at any time from an external fluid pressure and/or by external mechanical input.

The foregoing and other objects and features of the invention will be further understood from the following detailed description of preferred embodiments thereof and from the drawings wherein like reference numerals identify like parts throughout.

DESCRIPTION OF THE PREFERRED EMBODIMENTS

Figure 1:
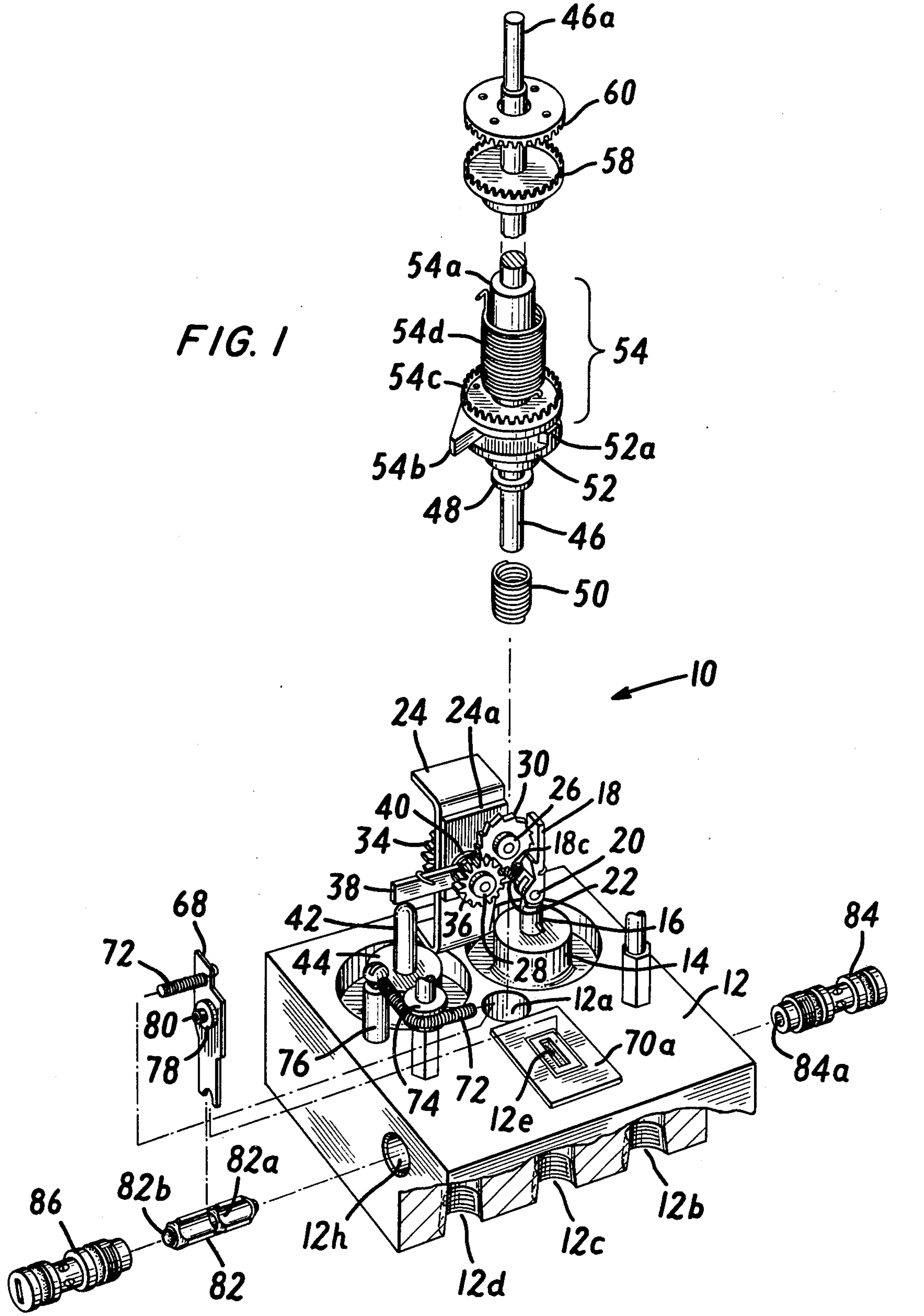
FIG. 1 is an exploded view of apparatus in accordance with the invention with its cover and operator member omitted for clarity.

Referring to the exploded showing of apparatus 10 of the invention in FIG. 1, base 12 has guide 14 joined therewith for guiding movement of count actuator 16. Actuator 16 has an integral end lug **16*a* (FIG. 2) interfittable with bottom ears of pawl 18, securing pin 20 effecting rotative support of pawl 18 by actuator 16. Spring 22 is mounted about pawl extension 18*c* (FIG. 2**) with the spring ends engaging the pawl and actuator and biasing them into alignment as shown.

Figure 2:
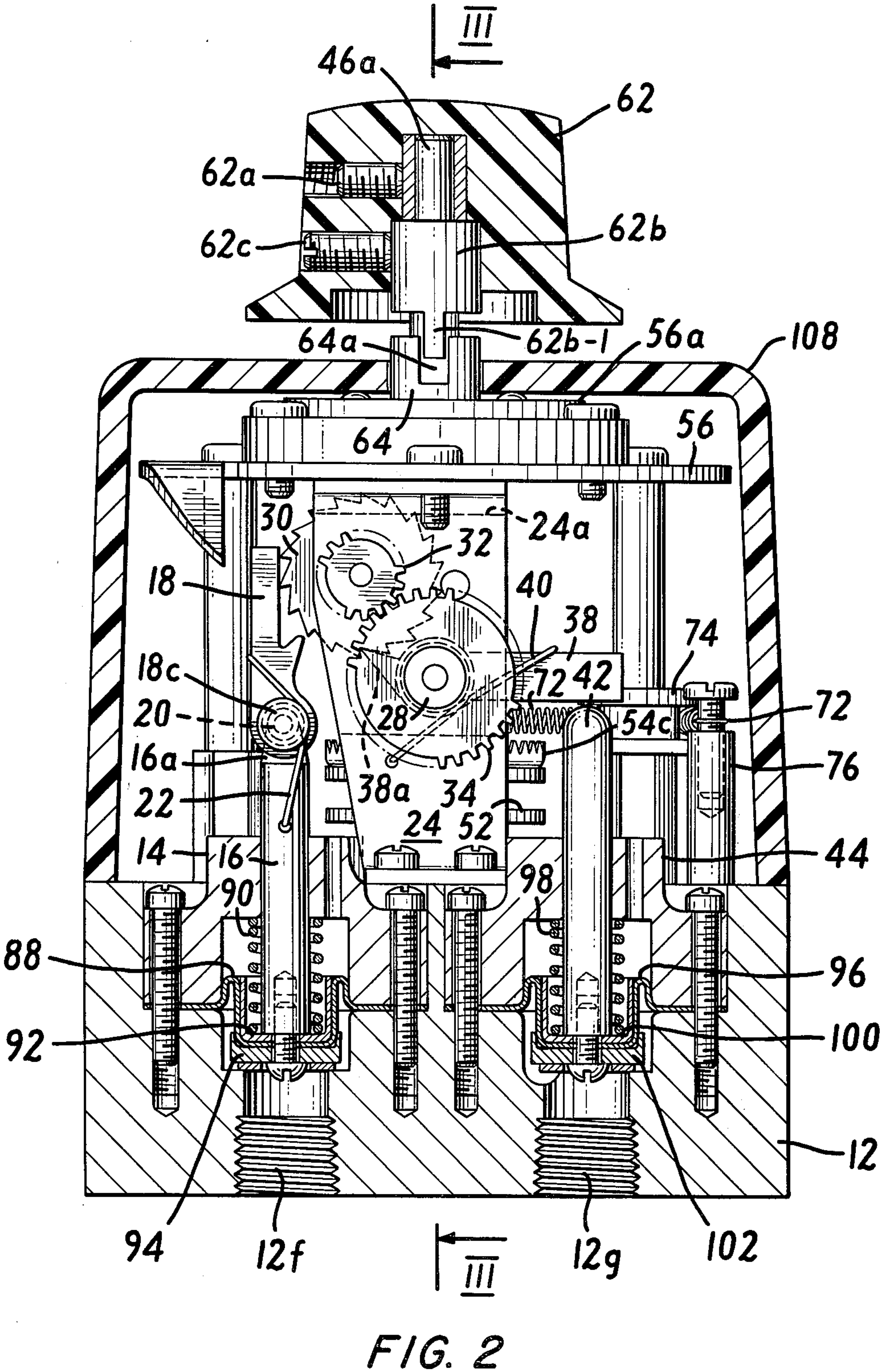
FIG. 2 is a side elevation of the FIG. 1 apparatus, inclusive of cover and operator member structure as seen from plane 11—11 of FIG. 3.

Plate 24, having reinforcing member **24*a*, is secured to base 12 and defines apertures therethrough for supporting hubs 26 and 28 (FIG. 3) for rotation. As further seen in FIG. 3, hub 26 has ratchet wheel 30 and pinion gear 32 keyed to its opposite ends. Hub 28 has gear 34 keyed to one end in meshing relation with pinion gear 32 and has a gear 36 keyed to the opposite hub end in meshing relation with crown gear 54*c*. At its midportion, hub 28 rotatively supports latch member 38 with end 38*a* thereof in engagement with ratchet wheel 30. Spring 40 encircles hub 28 with one end thereof passed through plate 24 and the other spring end passing over latch member 38 (FIG. 2**).

At its end distal from end **38*a*, latch member 38 spacedly overlies latch actuator 42, movement of which is guided by guide 44, joined with base 12 as in the case of count actuator guide 14. Movement of actuator 42 outwardly of base 12 will be seen to lift latch member 38 to move latch member end 38*a* out of latching engagement with ratchet wheel 30. Movement of count actuator 18** outwardly of base 12 brings pawl 16 into engagement with the teeth of ratchet wheel 30, advancing the ratchet wheel counterclockwise (FIG. 1). Gear 32 is advanced in like sense with gears 34 and 36 being rotated clockwise.

Figure 3:
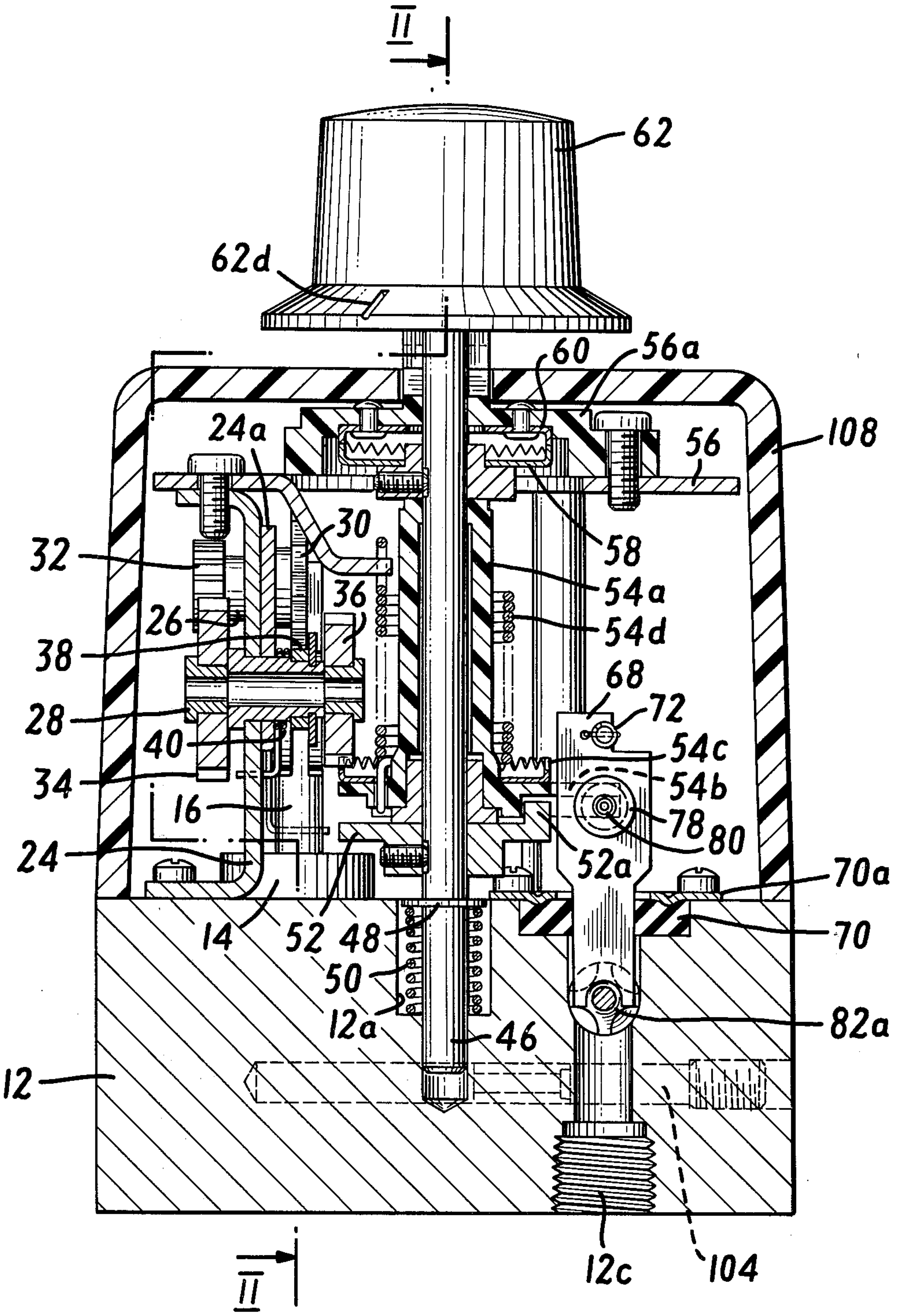
FIG. 3 is a front elevation of the FIG. 1 apparatus as seen from plane III—III of FIG. 2.

Base 12 includes opening 12*a* for receipt of the assembly shown upwardly of plate 24 in FIG. 1. Shaft 46 has a collar 48 secured to the lower end thereof, the collar being of lesser diameter than base opening 12*a*. Spring 50 is receivable in base opening 12*a* and biases collar 48 and hence shaft 46 upwardly when the parts of FIG. 1 are assembled, as shown in FIG. 3. Count presetting element 52 is secured to shaft 46 above collar 48. The upper surface of element 52 is flat excepting for upwardly extending lug 52*a*, which serves to restrain clockwise rotation (FIG. 1) of trip-dog assembly 54 by abutment therewith. Assembly 54 is rotative about shaft 46 and includes an elongate sleeve 54*a* defining projecting trip-dog 54*b* disposed in an interference path with count presetting element lug 52*a* (FIG. 3). Crown gear 54*c* is joined to sleeve 54*a* for rotation therewith. Torsion spring 54*d* encircles sleeve 54*a* and has its lower end passing through gear 54*c*. On assembly of the FIG. 1 mechanism, spring 54*d* is wound counterclockwise and its upper end is then passed through fixed housing part 56 (FIG. 3). Dog 54*b* is accordingly thereby rotated clockwise (FIG. 1) into abutment with count presetting element lug 52*a*. On such assembling, gear 54*c* is in meshing relation with gear 36 (FIG. 3), whereby trip-dog 54*b* is incrementally rotated with each cyclic, i.e., reciprocating, movement of actuator 16.

Upwardly of trip-dog assembly 54, shaft 46 has keyed thereto crown gear 58. On assembly of the FIG. 1 parts, with spring 50 urging shaft 46 upwardly, gear 58 is in biased meshing relation with crown gear 60, secured to housing part 56*a* (FIG. 3). With gears 58 and 60 meshed, shaft 46 is rotatively fixed and, accordingly, an outset or initial angular position of count presetting element lug 52*a* is established. By operator structure discussed below and connected to the upper end of shaft 46, the shaft is movable in predetermined measure, axially downwardly against the restraint of spring 50 to release gear 58 from meshing relation with gear 60, while retaining abutting-captive relation between lug 52*a* and trip-dog 54*b*. Shaft 46 is thereupon rotatable to establish other initial angular position for lug 52*a* according with any desired preset count condition.

The referenced operator structure (FIG. 2) includes a count preset knob 62 having a central bore for receiving shaft 46. The bore is of first diameter at its upward end for encircling necked-down shaft end portion 46*a* (FIG. 1) and has a transverse threaded passage providing for non-slip engagement of set screw 62*a* and shaft 46. A successive downward run of the bore is of second larger diameter for receiving guide key 62*b*, set screw 62*c* being threadable in another knob transverse passage for securing the knob and key 62*b*. Key 62*b* defines key elements, 62*b*-1 being shown in FIG. 2, entered in slots, 64*a* being shown in FIG. 2, of slotted guide 64 of housing part 56*a*. On downward movement of the knob 62, key 62*b* abuts quide 64 to prescribe a separation of gears 58 and 60 of above-discussed measure. If set screw 62*c* has been released, knob 62 can be rotated in turn rotating shaft 46 and lug 52*a* to vary its outset angular position and that of trip-dog 54 biased into abutment therewith by spring 54*d*.

Figure 5:
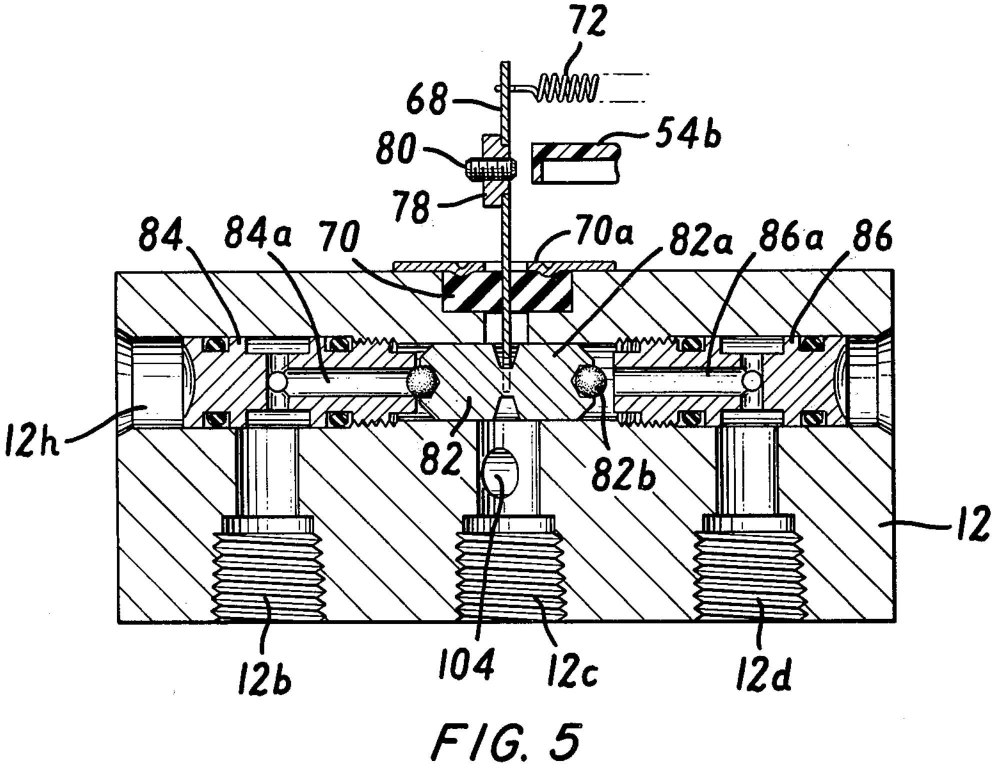
FIG. 5 is a sectional view of the output signal generating portion of the FIG. 1 apparatus.

Returning again to FIG. 1, base 12 has a bore extending transversely of opening 12*h* and communicating with downward conduits 12*b*, 12*c* and 12*d* and with upward opening 12*e*. A valve assembly, shown more particularly in FIG. 5, is entered in such transverse bore and is operated upon by valve-operating lever 68. Referring to FIG. 5, operating lever 68 is resiliently supported in base insert 70 for pivotal movement. Insert 70 is comprised of a block of elastomeric material seated in a cavity in base 12 and surrounding a portion of lever 68 between its ends. Plate 70*a* may suitably compress insert 70 to provide intimate sealing contact between the insert and lever 68. Lever 68 defines an upper aperture for receipt of spring 72 which extends about roller 74 (FIG. 1) and is secured to post 76. Downwardly of such aperture, lever 68 has a threaded boss 78 for receipt of adjusting member 80. At its bottom end, the lever engages elongate shuttle 82 (FIG. 5), which has peripherally-longitudinally-fluted part 82*a* and ball members 82*b* at its opposite ends. In its illustrated position (FIG. 5), part 82*a* is biased by lever 68 leftwardly under influence of spring 72 whereby leftward ball 82*b* is seated in closing relation to the valve seat defined by fixed sleeve 84. The channel 84*a* in sleeve 84 is accordingly blocked, preventing fluid pressure communication between conduit 12*b* and conduit 12*c*. Upon engagement of member 80 of lever 68 by dog 54*b*, lever 68 is pivoted counterclockwise (FIG. 5), displacing valve part 82*a* rightwardly and disposing leftward ball 82*b* in spaced relation to the valve seat of fixed sleeve 84. Conduits 12*b* and 12*c* are now in fluid pressure communication through fluid pressure passageways defined by the flutes of part 82*a* and channel 84*a*. Further, rightward ball 82*b* is now seated in closing relation to the valve seat defined by fixed sleeve 86, thereby blocking channel 86*a* in sleeve 86 and preventing fluid pressure communication between conduits 12*d* and 12*c*.

As will be seen from the FIG. 5 output portion of the apparatus of the invention, any variably preselectable pressure level signal may be applied to conduit 12*b* and furnished through conduit 12*c* as the apparatus output signal on operation of the valve through displacement of lever 68 by dog 54*b*. Conversely, conduit 12*c* is exhausted to conduit 12*d*, or pressurized at the pressure level applied to conduit 12*d*, when the valve is unoperated. This apparatus capability applies irrespective of the pressure level of input pulses which are applied to inlet passage 12*f* (FIG. 2) of the apparatus. Such inlet pulses prescribe cyclic movement of a fluid pressure to mechanical displacement transducer comprising seal 88, return spring 90 and fittings 92 and 94 which secure seal 88 to count actuator 16, fitting 94 defining a piston pressure face. On introduction of an input fluid pressure pulse in passage 12*f*, seal 88 is forcibly distended, rolling out within guide 14. Upon expiration of the input pulse, the seal reforms under influence of spring 90, thereby imparting a reciprocating movement to actuator 16.

A like transducer is employed for imparting cyclic movement to reset actuator 42 on application of a reset pulse to inlet passage 12*g* (FIG. 2). This transducer has seal 96, return spring 98 and fittings 100 and 102 which secure the seal to actuator 42.

Seals 88 and 96 are comprised of flexible diaphragms which effect a fluid-tight relation between the movable and fixed parts of the fluid-to-mechanical transducers. Each diaphragm includes a salient-shaped flexible portion extending between the fittings of the transducer and the wall of the inlet passage whereby movement of the transducer actuator is accompanied by a rolling movement of the salient-shaped flexible portion.

The reset pulse may be applied to passage 12g from an external resetting device, thereby providing time extent control of the output signal in conduit 12c by such device. Alternatively, passage 12g may be closed to external pressure, as by inserting a threaded plug therein whereby use is made of the conduit 12c output signal also as a reset signal. For this purpose, circuit 104 (FIGS. 3 and 5) may extend from passage 12g to conduit 12c.

Figure 4:
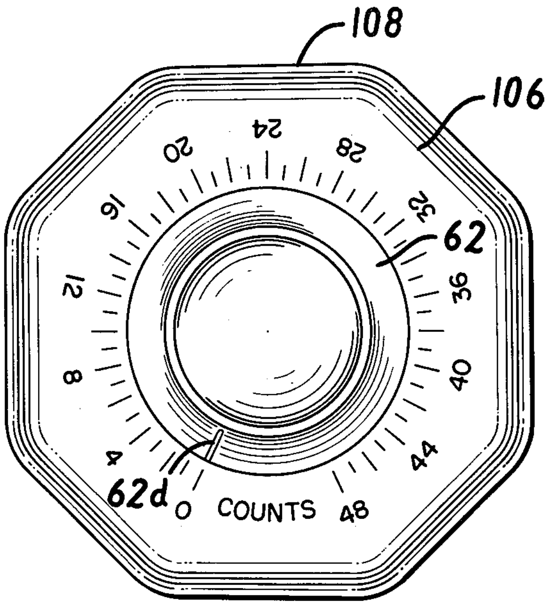
FIG. 4 is a plan view of the apparatus as shown in its FIGS. 3 and 4 attitude.

Considering FIG. 4, knob 62 includes an index 62d, registrable with decal 106 mounted on cover 108 which is suitably secured to base 12. Decal 106 identifies preselectable counts, and on release of set screw 62c and axial depression of knob 62, shaft 46 is rotatable as above discussed to rotate lug 52a and establish a position thereof according with the pulse count registered with index 62d and at which output signal generation is to occur. In FIG. 3, dog 54b is positioned in its maximum preset count by lug 52a, i.e., gear 54c need be rotated almost full circle to bring the dog into operating engagement with lever 68.

In the course of pulse counting, the apparatus may be mechanically reset at user option by depressing knob 62. This action displaces shaft 46 axially, releasing gear 54c from its counting engagement with gear 36 and permitting spring 54d to return dog 54b into abutment with lug 52a.

From the foregoing, it will be seen that the described apparatus achieves its accumulate function, responsively to a fluid-to-mechanical transducer, by accumulator structure inclusive of a totalizing member (ratchet wheel 30) and an output element (dog 54b) displaced incrementally with the totalizing member by use of a gear train extending therebetween. Such gear train is advantageous over direct mechanical engagement of the ratchet wheel and output valve operating lever, as in the Loveless et al. patent noted above. Thus, the gear train facilitates variation in the incremental degree of movement of accumulator output element (trip-dog 54b) in relation to movement of count actuator 16. Such variation is accommodated simply by changing the gears in the gear train to attain the desired ratchet wheel to-trip-dog movement ratio. The invention also contemplates the introduction of a further gear in the gear train to provide for a relative reversal in the sense of rotational movement of the trip dog responsive to ratchet wheel rotation.

Various modifications may be introduced in the described apparatus without departing from the invention. Thus, the particularly illustrated and discussed embodiment is intended in a descriptive and not in a limiting sense. The true spirit and scope of the invention is set forth in the following claims.

What is claimed is:

1. Apparatus for providing an output signal of variably preselectable fluid pressure level upon receipt of input fluid pressure pulses in predetermined number, comprising:

(a) input transducer means having an inlet passage for receipt of said input pulses and a count actuator cyclically movable on receipt of each such pulse;

(b) accumulator means having a totalizing member engaged by said count actuator in the course of each such cyclic movement for counting said input pulses and an output element displaced incrementally from an initial position upon each such engagement of said count actuator with said totalizing member;

(c) said accumulator means further including latch means operable by latch input independent of the fluid pressure of said input pulses for latching said totalizing member upon each incremental displacement of said output element engageable therewith;

(d) count presetting means for displacing said output element into said initial position according with said predetermined number;

(e) output means having an input conduit in fluid pressure isolation with respect to said inlet passage and thereby pressurizable at such variably preselectable pressure level irrespective of the pressure level of said input pulses, an output conduit for furnishing said apparatus output signal, a valve operable to connect said input conduit with said output conduit and a valve operator disposed in the path of movement of said accumulator means output element and operating said valve on engagement of said operator with said accumulator means output element; and (f) reset means coupled to said latch means for releasing said latch means from engagement with said totalizing member in response to reset fluid pressure input independent of said input pulses and for causing said output element to return to its initial position.

2. The apparatus claimed in claim 1 further including resilient means engaging said valve operator and thereby biasing said valve into a position isolating said output conduit from fluid pressure communication with said input conduit.

3. The apparatus claimed in claim 1 further including first resilient means for biasing said accumulator means output element in the direction of said initial position, and wherein said latch means engaging said totalizing member for opposing movement of said output element to said initial position upon each such incremental displacement thereof comprises second resilient means for biasing said latch means into engagement with said totalizing member.

4. The apparatus claimed in claim 3 wherein said reset means engages said latch means to release the same from such engagement with said totalizing member on such operation of said reset means.

5. The apparatus claimed in claim 4 wherein said reset means includes reset transducer means having an inlet passage for receipt of a reset fluid pressure input pulse for resetting said accumulator means to zero count and a reset actuator cyclically movable on receipt of each said reset pulse into and out of engagement with said latch means.

6. The apparatus claimed in claim 5 further including conduit means providing communication between said output conduit of said output means and said inlet passage of said reset transducer means whereby said apparatus output signal serves also as said reset pulse.

7. The apparatus claimed in claim 5 wherein said inlet passage of said reset transducer means defines an end opening accessible exteriorly of said apparatus for receiving said reset pulse.

8. The apparatus claimed in claim 1 wherein said inlet passage of said input transducer means is elongate, said input transducer means further including a movable diaphragm supported in said inlet passage, fitting means for connecting said count actuator to said diaphragm for movement therewith and resilient means for biasing said fitting means longitudinally with respect to said inlet passage.

9. The apparatus claimed in claim 8 wherein said diaphragm includes a salient-shaped flexible portion extending between said fitting means and said inlet passage whereby such movement of said count actuator is accompanied by a rolling movement of said salient-shaped flexible portion.

10. The apparatus claimed in claim 1 wherein said valve includes a fixedly disposed valve sleeve in fixed fluid pressure communication with said input conduit, said valve sleeve defining a valve seat, and a shuttle having a valve closure part movable into sealing engagement with said valve seat, said shuttle defining fluid passages extending peripherally thereon from said shuttle closure part, said shuttle passages being in fluid pressure communication with said output conduit.

11. The apparatus claimed in claim 10 wherein said shuttle is elongate and said shuttle passages are constituted by longitudinal flutes formed on the periphery of said shuttle.

12. The apparatus claimed in claim 1 wherein said accumulator means totalizing member comprises a rotatably supported ratchet wheel, said accumulator means further including gear means for imparting rotative movement of said ratchet wheel to said accumulator means output element.

* * * * *